(12) United States Patent
Frantz et al.

(10) Patent No.: US 7,085,385 B2
(45) Date of Patent: Aug. 1, 2006

(54) METHOD AND APPARATUS FOR INITIATING STRONG ENCRYPTION USING EXISTING SSL CONNECTION FOR SECURE KEY EXCHANGE

(75) Inventors: Christopher J. Frantz, Houston, TX (US); Andrew C. Cartes, Cypress, TX (US); E. David Neufeld, Magnolia, TX (US); John R. Carpenter, Katy, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 10/037,491

(22) Filed: Jan. 4, 2002

(65) Prior Publication Data
US 2003/0131257 A1    Jul. 10, 2003

(51) Int. Cl.
*H04L 9/12* (2006.01)
(52) U.S. Cl. .................................. 380/277; 713/156
(58) Field of Classification Search .............. 726/6, 726/14, 15; 380/277; 713/155, 156
See application file for complete search history.

(56) References Cited

U.S. PATENT DOCUMENTS

| | | | |
|---|---|---|---|
| 5,790,895 A | 8/1998 | Krontz et al. .............. 395/884 |
| 5,870,544 A * | 2/1999 | Curtis ........................ 726/14 |
| 5,898,861 A | 4/1999 | Emerson et al. ........... 395/500 |
| 6,094,485 A * | 7/2000 | Weinstein et al. ........... 380/30 |
| 6,215,877 B1 * | 4/2001 | Matsumoto ................. 380/277 |
| 6,223,287 B1 * | 4/2001 | Douglas et al. ............ 713/178 |
| 6,766,165 B1 * | 7/2004 | Sharma et al. ............. 455/423 |
| 2003/0037250 A1 * | 2/2003 | Walker et al. ............. 713/200 |
| 2003/0046542 A1 * | 3/2003 | Chen et al. ................ 713/176 |
| 2003/0114190 A1 * | 6/2003 | Want et al. ................ 455/557 |

OTHER PUBLICATIONS

Schneier, "Applied Cryptography, Protocols, Algorithms and Source Code in C", Second Edition, p. 397-398.*
Angelo et al., "Method and Apparatus to Provide Enhanced Computer Protection," U.S. Appl. No. 09/540,697, filed Mar. 31, 2000.
Angelo et al., "Method and Apparatus for Providing Enhanced Computer Security," U.S. Appl. No. 09/540,812, filed Mar. 31, 2000.
Angelo et al., "Computer System Having Security Features," U.S. Appl. No. 09/540,811, filed Mar. 31, 2000.
Emerson et al., "Operating System Independent Method and Apparatus for Graphical Remote Access," U.S. Appl. No. 09/438,253, filed Nov. 12, 1999.

(Continued)

*Primary Examiner*—Matthew Smithers

(57) ABSTRACT

The disclosed embodiments relate to the field of remote server management. More particularly, the disclosed embodiments relate to providing secure communications in the context of remote server management. In an exemplary embodiment of the invention, a client computer uses an established encrypted communication channel to request secret data from a managed server. The managed server provides the requested secret data, which is used by both the managed server and the client computer to encrypt communications across a second communications link.

16 Claims, 4 Drawing Sheets

OTHER PUBLICATIONS

Frantz et al., "USB Virtual Devices," U.S. Appl. No. 09/544,573, filed Apr. 6, 2000.

Emerson et al., "Video Eavesdropping and Reverse Assembly to Transmit Video Action to a Remote Console," U.S. Appl. No. 08/733,254, filed Oct. 18, 1996.

"Compaq Remote System Management for Industry-Standard Servers," Compaq Computer Corporation Technology Brief, Sep. 2001.

"Remote Server Management with Integrated Remote Console," Compaq Computer Corporation Technology Brief, Oct. 21, 1996.

\* cited by examiner

METHOD AND APPARATUS FOR INITIATING STRONG ENCRYPTION USING EXISTING SSL CONNECTION FOR SECURE KEY EXCHANGE

BACKGROUND OF THE INVENTION

1. Field of the Invention

This invention relates generally to remote server management in networked computer systems and, more particularly, to providing secure communications paths for remote server management communications.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. One obstacle is connecting computers that use different operating systems ("OSes") and making them communicate efficiently with each other. Each different OS (or even variations of the same OS from the same company) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment or even between groups of computers in different cities and countries. Such a configuration would typically include a large number of servers, each connected to numerous client computers.

Further, the arrangements of servers and clients in a larger network environment could be connected in any of an infinite number of topologies that may include local area networks ("LANs"), wide area networks ("WANs") and municipal area networks ("MANs"). In these larger networks, a problem with any one server computer (for example, a failed hard drive, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed remotely (for example, from a centralized administration site). Tools that facilitate remotely analyzing and servicing server problems help to control network management costs by reducing the number of network management personnel required to maintain a network in good working order. Remote server management also makes network management more efficient by reducing the delay and expense of analyzing and repairing network problems. Using remote management tools, a member of the network management team may identify problems and, in some cases, solve those problems without the delay and expense that accompanies an on-site service call to a distant location.

The growth of modern computer systems and the need to communicate remotely with servers on such a vast geographic scale has, unfortunately, resulted in some unintended negative consequences. Large, geographically diversified computer networks are susceptible to attacks by hackers who desire to gain access to information stored on those computer networks. Such hackers are sometimes motivated by nothing more than the pride they feel when they accomplish a difficult and technically challenging goal in the face of significant efforts to repel their efforts. Sadly, however, many hackers seek to compromise network security for material gain.

The data stored on modern computer networks ranges from military and corporate secrets to personal information, including social security numbers, bank records or information about credit card accounts. This information is obviously very valuable. If a conniving hacker successfully breaks into a network environment where such data is stored, the hacker may use the data directly or sell it to others who would not hesitate to use the information to the disadvantage of its rightful owner. The theft of supposedly secure data could subject the company that stored the data to falling customer confidence resulting in declining business opportunities. Failure to adequately protect the confidential information of others can even give rise to legal liability in some cases.

The complexity of modern computer networks and the equipment that comprises those networks provides hackers with many, many avenues to access secured data. Hackers frequently seek to take advantage of operational quirks of computer hardware and software (such as browser software) that the designers of that hardware or software did not intend or foresee. Even aspects of computer equipment that are intended to provide new features and additional security give imaginative hackers opportunities to compromise network security and steal confidential data.

Remote server management tools that communicate with network servers are a favorite target of hackers' attention. This is true because remote server management tools often have the capability to give a user broad access rights to network servers. Server management requires broad network access rights of the type typically possessed by network administrators who have access to even the most sensitive data stored on a server.

A common practice employed by hackers is to obtain access to a network and eavesdrop or "snoop" communications until they identify a communication that is likely to be a network management communication. If a knowledgeable hacker is able to compromise a management communication with a server, the hacker will undoubtedly have a much greater chance to gain access to sensitive data stored on that server.

The security problems previously discussed are magnified in a remote server management setting, especially for remote communications that are established using publicly available communication paths such as the Internet. The public nature of the Internet makes it a prime target for hackers as they are able to snoop huge volumes of communications in their efforts to locate a vulnerable server.

Of course, the broad public availability of the Internet, which makes it of such interest to hackers, is also of significant appeal to the designers of remote server management tools. A primary goal of remote server management professionals is to create tools to facilitate remote management in the broadest range of contexts possible. A tool which is able to provide remote management capabilities over the Internet is directly in keeping with that desire.

To facilitate the goal of providing remote server management across publicly accessible data paths such as the Internet while at the same time inhibiting the ability of hackers to intercept such communications, a remote network management tool that is able to establish a strongly encrypted communication path with a managed server across the publicly available communication path is highly desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
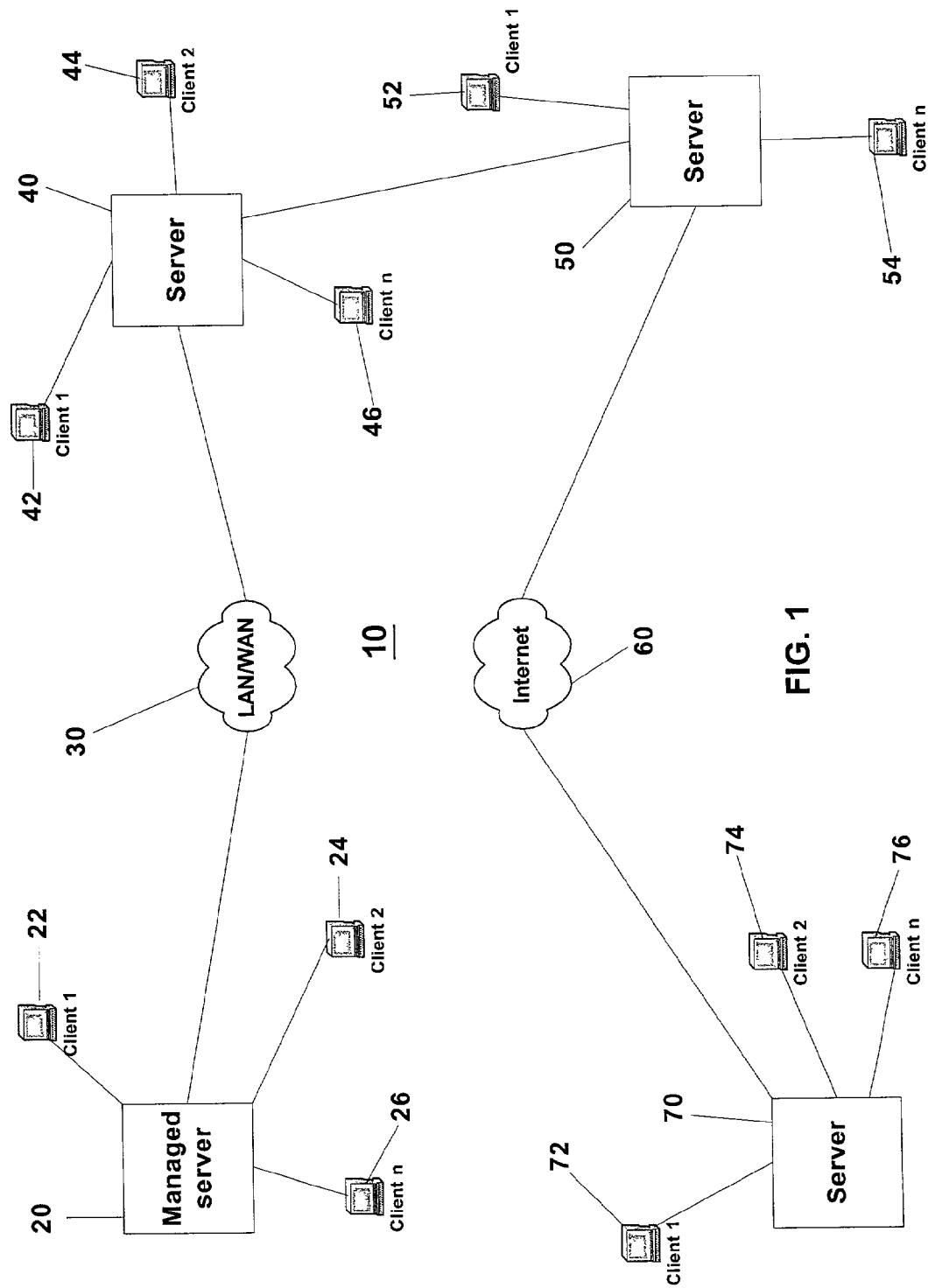
FIG. 1 is a block diagram illustrating an exemplary computer network system in which a remote server management controller of the present invention may be practiced.

Turning now to the drawings and referring initially to FIG. 1, a block diagram of an exemplary computer network system in which the present invention may be practiced is illustrated and designated using a reference numeral 10. The computer network 10 is intended to illustrate a typical modern computer network configuration with all its complexities and flexibility. A managed server 20 is connected to a plurality of client computers 22, 24 and 26. For purposes of explaining the present invention clearly, only one server on the network 10 has been designated as a "managed server." In practice, those of skill in the art will appreciate that the any or all of the servers in the network 10 could simultaneously include hardware and software devised according to the invention, making those servers "managed servers" as well.

The managed server 20 may be connected to as many as n different client computers. The magnitude of n is a function of the computing power of the managed server 20. If the managed server has large computing power (for example, faster processor(s) and/or more system memory) relative to other servers on the network, it will be able to effectively serve a relatively large number of client computers.

The managed server 20 is connected via a typical network infrastructure 30, which may consist of any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Those skilled in the art will appreciate that neither the exact topology of the network illustrated in FIG. 1 nor the protocol of network communication (for example, Ethernet or any number of other common protocols) is a crucial aspect of the present invention. Moreover, the network topology shown in FIG. 1 is hypothetical and is shown only to explain the present invention with greater clarity by giving an example of a network environment in which the present invention is useful.

As explained in detail below, the present invention is illustrated as being deployed in a remote server management controller by way of example. The exemplary remote server management controller may be hosted in the managed server 20. The exemplary remote server management controller may be accessed via a remote console application program (or browser program) running on any of the client computers shown in FIG. 1.

For purposes of explaining the invention clearly, the remainder of this description is written with the assumption that the server 70 and clients 72, 74 and 76 are located in a remote administration site. The further assumption is made that a user (network administrator) located at the network administration site desires to use a remote console program running on one of the clients 72, 74 or 76 to establish a remote server management communication with the managed server 20. To accomplish this connection, the communication path between server 70 and managed server 20 must traverse the Internet 60, which is publicly accessible and prone to eavesdropping and snooping by hackers. After traversing the Internet 60, the communication path between the server 70 and the managed server 20 traverses servers 40, 50 and network infrastructure 30 in a typical manner before terminating at the managed server 20.

Figure 2:
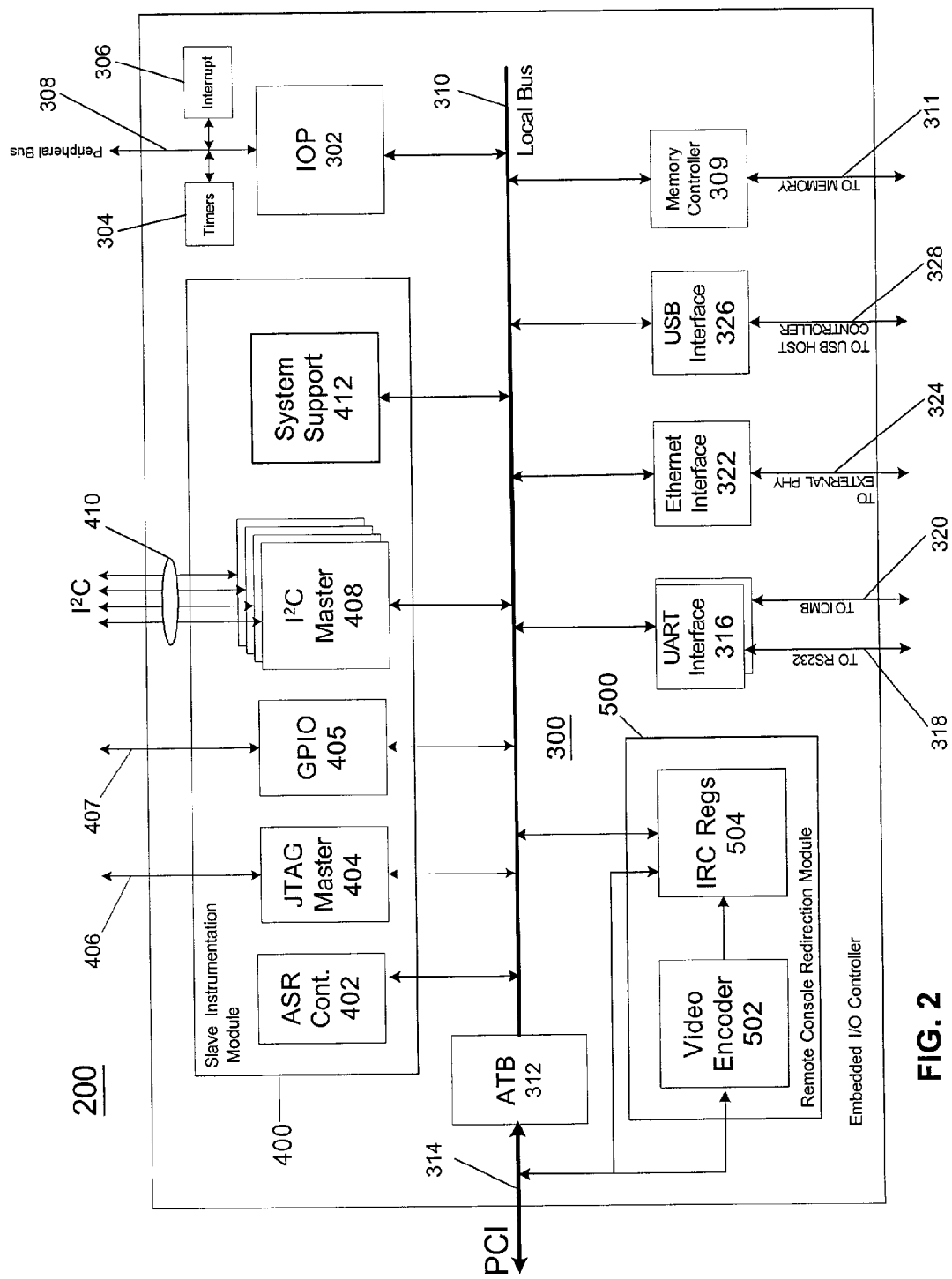
FIG. 2 is a functional block diagram of one embodiment of a remote server management controller constructed according to the present invention.

FIG. 2 shows a functional block diagram of one exemplary embodiment of a remote server management controller 200 constructed according to the present invention. The remote server management controller 200 may be implemented in a single application specific integrated circuit ("ASIC"). Alternatively, the remote server management controller 200 may be implemented in a plurality of integrated circuits or discrete components. Those skilled in the art will appreciate that implementation details such as deciding which functional aspects of remote server management controller 200 are implemented in a single ASIC or different ASICs are matters of design choice and not crucial aspects of the present invention.

The remote server management controller 200 may be implemented so that it is powered and capable of operation whether or not the managed server 20 (FIG. 1) is powered up (turned on) or online. Powering the remote server management controller 200 regardless of whether the host managed server is turned on allows the remote server management controller 200 to monitor, analyze and potentially intervene to correct the widest possible range of system problems that may befall the managed server 20 (FIG. 1).

The logic of the remote server management controller 200 is broken down into three main functional blocks. The first of these three functional blocks is an embedded I/O controller 300, which is essentially an independent computer system that is integrated within the managed server 20 (FIG. 1). The second and third functional blocks of the remote server management controller 200 are a slave instrumentation module 400 and a remote console redirection module 500. As described below, the embedded I/O controller 300 monitors and controls a wide range of conditions in the managed server 20 via the slave instrumentation module 400 and the remote console redirection module 500.

The embedded I/O controller 300 comprises an Input/Output processor ("IOP") 302, which provides general control and functions as a management processor for the remote server management controller 200. The IOP 302 may be implemented as a 32-bit RISC processor, but other processor implementations may be employed as well. The IOP 302 is operatively coupled to a timer module 304 and an interrupt controller 306 via a peripheral bus 308.

In one exemplary embodiment of the invention, a memory controller 309 is operatively coupled to the internal local bus 310. The memory controller 309 is, in turn, operatively coupled to dedicated memory via a memory interface 311. The dedicated memory may be battery-backed SRAM, SDRAM, ROM, NVRAM or any other appropriate type of memory.

The IOP 302 (located in the embedded I/O controller 300) is operatively coupled to the other functional modules (and many sub-modules) of the remote server management controller 200 via an internal local bus 310. Those of ordinary skill in the field will appreciate that the internal local bus 310 exists to allow communication between and among the logical components of the remote server management controller 200. The implementation details of the internal local bus 310 are a matter of design choice and not a crucial aspect of the present invention.

An address translation and bridging ("ATB") unit 312 is operatively coupled to the internal local bus 310 and to a PCI bus 314. PCI bus 314 is integral within and operatively coupled with the managed server 20 (FIG. 1). Preferably, the PCI bus 314, which serves as the main communication interface between the managed server 20 (FIG. 1) and the remote server management controller 200, may be configured as a 32-bit, 33 MHz PCI master/slave interface. In a typical system implementation, the remote server management controller 200 resides on the "compatibility" segment of PCI bus 314, but the PCI bus segment on which the remote server management controller is disposed is not a crucial aspect of the invention. The ATB unit 312 is constructed to allow the remote server management controller 200 to decode bus cycles on the PCI bus 314 and to communicate over the PCI bus 314 by initiating PCI bus cycles.

The embedded I/O controller 300 provides a plurality of communication interfaces that can be employed to establish communication sessions with the remote server management controller 200. One such communication interface is a UART interface module 316, which is operatively coupled to internal local bus 310. The exemplary UART interface module 316 comprises two standard 16550 UARTs, each of which may provide a separate serial communication interface between the remote server management controller 200 and the external world. Both UARTs are mapped into the address space of the IOP 302 and can be accessed via PCI bus 314 or by the IOP 302. Either UART may be implemented so that it can be reset through a control register in the address space of the IOP 302.

Outputs from the UART interface module 316 are typically routed to transceivers (not shown), where they may be converted into a wide variety of serial interface types. Examples of the types of serial interfaces that may be provided by the UART interface module 316 are a standard RS-232 interface 318 or an interface that complies with the Intelligent Chassis Management Bus ("ICMB") specification promulgated by Intel Corporation (ICMB interface 320). Those of ordinary skill in the field will appreciate that the RS-232 interface 318 may be used to connect to a wide range of industry standard modems, terminal servers and the like.

Embedded I/O controller 300 further comprises an Ethernet interface 322, which is operatively coupled to the internal local bus 310. Ethernet interface 322 provides the main external communication interface between the remote server management controller 200 and the outside world. In the exemplary embodiment shown in FIG. 2, the integrated portion of the Ethernet interface 322 includes a MAC (Media Access Controller), inbound and outbound FIFOs, and a DMA engine to automatically transfer packets to and from memory. The Ethernet interface 322 requires a connection via interface 328 to an external PHY (not shown) and typical magnetic coupling to couple the PHY to the wire that serves as the transmission media.

Those skilled in the art will appreciate that a user may connect remotely to the remote server management controller 200 via the Ethernet interface 322. Such a connection may be made, for example, using a remote console application running on a client computer anywhere on the network that includes managed server 20 (FIG. 1). Moreover, the exemplary embodiment is capable of establishing secure communications between servers on the same network even when those servers are not connected to or by a publicly available data path such as the Internet. For purposes of clearly explaining the present invention, however, this description assumes that a remote user desires to establish a management communication session with the managed server 20 across the Internet 60 (FIG. 1). Those of ordinary skill in the field will appreciate that the Ethernet interface 322 may be configured to transmit and receive data according to the well-known TCP/IP protocol to allow the remote server management controller to be accessed via the Internet 60 (FIG. 1).

Embedded I/O controller 300 further comprises a USB interface 326, which is operatively coupled to the internal local bus 310. The USB interface 326 is connected to a USB host controller (not shown) via a USB host controller interface 328. The USB interface 326 is connected to one port of a USB host controller, which is typically located in a south bridge portion of the chipset of the managed server 20 (FIG. 1). When implemented in this way, the IOP 302 of the remote server management controller 200 may establish "virtual USB peripherals" that will be seen and recognized by any USB-aware OS or properly adapted system BIOS. These virtual peripherals may be presented to any USB-aware OS to allow communication with the OS in a common, OS-independent manner.

The next major functional block of the remote server management controller 200 is the slave instrumentation module 400. The primary purpose of the slave instrumentation module 400 is to provide the hardware infrastructure to implement control and monitoring functions in the managed server 20 (FIG. 1) as dictated by the IOP 302 in conjunction with dedicated application software such as remote console management software running on a client computer.

The slave instrumentation module 400 comprises an automatic server recovery ("ASR") controller 402, which operates to automatically respond to catastrophic failures of the managed server 20 (FIG. 1). The ASR controller 402 is operatively coupled to the internal local bus 310. The ASR controller 402 continually monitors whether the OS of the managed server 20 (FIG. 1) is operational by controlling a dead-man timer that requires periodic servicing by the OS. If the OS of the managed server 20 (FIG. 1) does not service the dead-man timer within a predetermined time, the ASR controller 402 resets the processor of the managed server 20 (FIG. 1) causing the managed server 20 (FIG. 1) to reboot.

A general purpose input/output module ("GPIO") 405 is provided in the exemplary embodiment of the slave instrumentation module 400. The GPIO provides a versatile communication interface that may be used for a wide variety of purposes.

The slave instrumentation module 400 also comprises a JTAG master 404. The JTAG master 404 is operatively coupled to the internal local bus 310. The JTAG master 404 comprises a standard JTAG interface 406, which is operatively coupled to a corresponding standard JTAG interface (not shown) on the motherboard of the managed server 20 (FIG. 1). Through the JTAG master 404, the remote server management controller 200 can perform a wide range of control functions on the managed server 20 (FIG. 1). These functions include updating or repairing the BIOS of the managed server 20 by reprogramming the non-volatile memory where the BIOS resides.

The slave instrumentation module 400 further comprises an $I^2C$ master 408, which is operatively coupled with the internal local bus 310. The $I^2C$ master 408 has the capability of controlling a plurality of independent $I^2C$ serial channels 410. For purposes of example only, four (4) separate $I^2C$ channels are shown in FIG. 2. The $I^2C$ master 408 comprises a separate $I^2C$ engine for controlling each separate $I^2C$ channel.

The slave instrumentation module 400 additionally comprises a block of system support logic 412. The system support logic 412 is operatively coupled to the internal local bus 310. The system support logic 412 provides a variety of housekeeping functions for the remote server management controller 200. Examples of these functions include providing the EISA bus ID, flash ROM support, ECC support, hot spare boot support, system post monitor support, floppy write protect, SMI base security measures, open hood detection and the like.

The third and final major functional block of the remote server management controller 200 is the remote console redirection module 500, which comprises a video encoder 502 and integrated remote console ("IRC") registers 504. The IRC registers 504 receive raw data snooped from the PCI bus 314. Under control of the IOP 302, some of the IRC registers 504 may function as a virtual communication device ("VCD") that may be used to intercept UART communications. Data intercepted through the VCD may be altered by the IOP and/or redirected to other outputs of the remote server management controller 200. For example, data intercepted by the VCD may be redirected to a remote user via the Ethernet interface 322.

Figure 3:
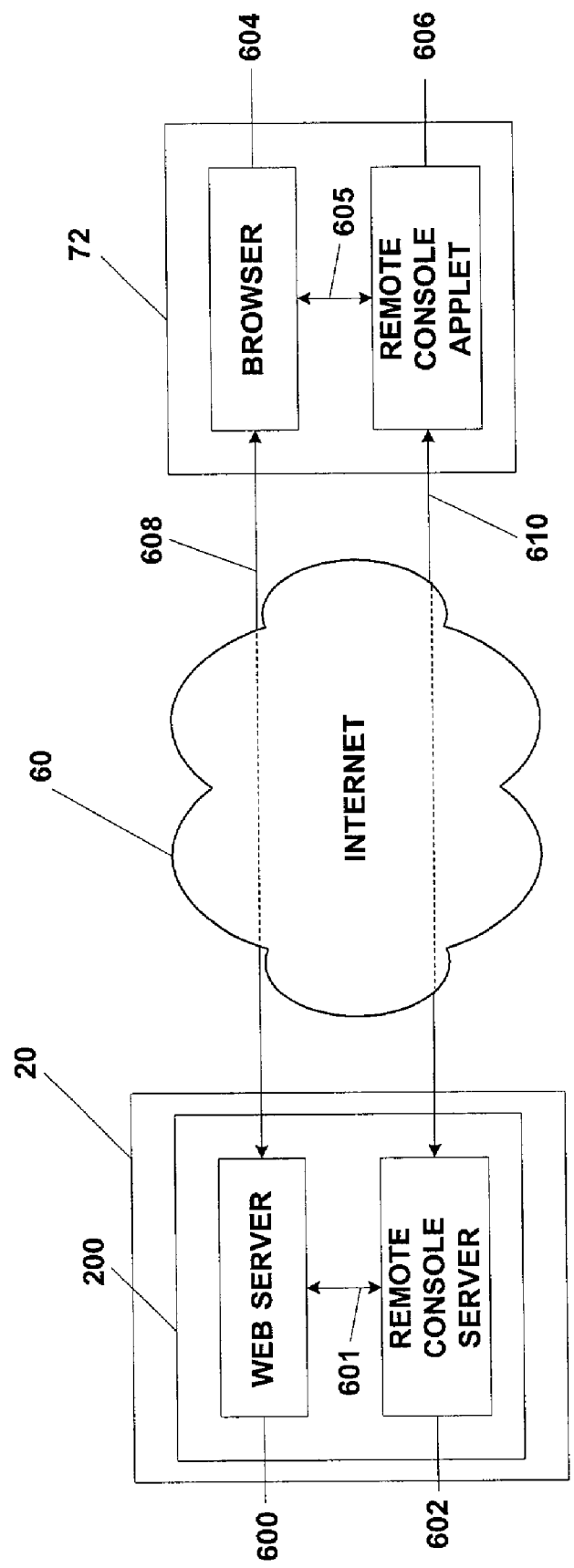
FIG. 3 is a functional block diagram showing an exemplary embodiment of hardware and software elements useful to establish a secure connection with a managed server across a publicly accessible data path such as the Internet.

FIG. 3 is a functional block diagram showing an exemplary embodiment of hardware and software elements useful to establish a secure connection between the client computer 72 (FIG. 1) and the managed server 20 (FIG. 1) across a publicly accessible data path such as the Internet 60 (FIG. 1). In FIG. 3 the client computer 72 (FIG. 1) is connected directly to the Internet 60, which is, in turn, connected to managed server 20 (FIG. 1). For purposes of clarity, the intervening connections through the servers 40 and 50 (FIG. 1) and the network interface 30 (FIG. 1) are not shown in FIG. 3.

The client computer 72 is shown in FIG. 3 (as opposed to any of the other clients illustrated in FIG. 1) for illustrative and explanatory purposes only. Those of ordinary skill in the art will appreciate that any client computer connected to the network environment of the managed server 20 (FIG. 1) or with access to the Internet 60 (FIG. 1) may be used to establish a secure management communication session with managed server 20 (FIG. 1).

In the exemplary embodiment, the remote server management controller 200 provides a web server 600. The web server 600 may be a functional block of the firmware stack that is executing on the IOP 302 (FIG. 2). The web server 600 provides the functionality to (1) communicate on the Internet 60 and (2) serve up information and data (for example, web pages or Java applets) to be displayed to a user in response to requests made by the user via a browser application 604. The browser application 604 may be any of a wide variety of browser applications that are generally available (for example, Netscape by AOL or Internet Explorer by Microsoft).

In the exemplary embodiment shown in FIG. 3, a remote console server 602 is implemented by the remote console redirection module 500 (FIG. 2) in conjunction with the slave implementation module 400. The remote console server 602 has the capability of providing a user with management and condition (health) data gathered by the slave instrumentation module 400. The web server 600 and the remote console server 602 may exchange information with each other over data path 601, which may comprise the internal local bus 310 (FIG. 2).

As described above, the remote server management controller 200 may obtain textual and graphical video images and reset sequence data from managed server 20 (FIG. 1). In addition, keyboard input (keystroke) data and mouse position information may also be obtained by the remote server management controller 200.

The remote console server 602 may operate to transmit gathered textual video data, graphical video data, keystroke information and/or mouse movement information to a user, who is accessing the remote server management controller 200 using a remote console applet 606. The user may also communicate control information to the remote console server 602 via the remote console applet 606.

The remote console applet 606 is an application program that is invoked by a user to communicate with the remote console server 602. In the illustrative situation shown in FIG. 3, the user communicates with the remote console server 602 located in the remote server management controller 200 by running remote console applet 606 on client computer 72 (FIG. 1). Examples of programs that may function as remote console applets are Carbon Copy, VNC (see http://www.uk.research.att.com/vnc/) and PC-Anywhere. The remote console applet 606 has the ability to communicate with the browser 604 via a communication path 605. The communication path 605 may comprise the message passing capability of the OS of the client computer 72.

As shown in FIG. 3, the browser application 604 may establish a communication session with web server 600 across the Internet 60. For purposes of illustration, the communication channel between the browser application 604 and the web server 600 is designated with reference numeral 608.

The browser application 604 typically supports a secure communication protocol called SSL, which stands for Secure Sockets Layer. The SSL protocol is well-known in the art and is commonly used to facilitate secure transactions over the Internet 60. While SSL is used to encrypt communications between the browser 604 and the web server 600 in the exemplary embodiment, those of ordinary skill in the art will appreciate that other secure protocols may be used instead of SSL. The choice of secure protocol is not a crucial feature of the present invention.

The SSL protocol supports the establishment of an encrypted communication path between the browser 604 and a server that is SSL-compatible. In the exemplary embodiment shown in FIG. 3, the web server 600 is SSL-compatible.

The first step in establishing a secure communication between the browser 604 and the web server 600 is the establishment of a typical non-secure communication link using a protocol such as TCP/IP. After a non-secure connection is established between the browser 604 and an SSL server (such as the web server 604), the browser 604 and the web server 600 negotiate to initiate a secure SSL communication link (a "socket"). The SSL protocol supports a large number of encryption algorithms and other security functions such as digital certificate generation. As part of the initial negotiation, the browser 604 and the web server 600 agree to use a common encryption algorithm and other parameters necessary to facilitate secure communication.

After the browser 604 and the web server 600 agree on the encryption algorithm and other necessary parameters, the browser 604 requests the public key of the web server 600. The web server 600 responds and may send the public key in the form of a digital certificate.

Next, the browser 604 sends the web server 600 a secret (for example, a random number) that has been encrypted with the server's public key. The server decrypts the secret using its private key (typically, a mathematical inverse of its public key). The browser 604 and web server 600 each use the secret sent by the browser 604 to generate a shared secret key. The browser 604 authenticates that the web server 600 has generated the same secret key. After authentication, the secret key is used to encrypt subsequent communications between the browser 604 and the web server 600.

The browser 604 and web server 600 each may in fact generate a plurality of shared secret keys for different purposes (for example, encryption, message integrity and/or cipher initialization). For purposes of illustration, the example in this discussion refers only to the generation of a single shared secret key. Also, the number of secret keys generated by the browser and/or the server is not a crucial aspect of the invention. Once the socket is established between the browser 604 and the web server 600, information transmitted across the socket is practically indecipherable to eavesdroppers such as hackers because it is computationally too expensive to decipher the packets without prior knowledge of the keys being used.

In the exemplary embodiment of the invention shown in FIG. 3, the remote console applet 606 may separately establish an independent communication path with a remote server console 602. This communication path may be used by a user to retrieve management data from and send control data to the remote server management controller 200. For purposes of illustration, the communication channel between the remote console applet 604 and the remote console server 602 is designated with reference numeral 610.

When the remote console applet 606 first establishes the communication link 610, the communication link 610 is "in the clear," which means that communication thereon is not encrypted. It is desirable to make the communication link 610 secure because the link 610 is used to transmit management and control data (for example, textual video data, graphical video data, keystroke data, mouse movement data and command and control data) of a most sensitive nature during remote management communication sessions with the remote server management controller 200. The management and control data transmitted across communication link 610 would, if intercepted, improve a hacker's chances of gaining access to secure data stored on the managed server 20 (FIG. 1).

The communication link 610 could be secured in the manner described above with respect to the establishment of secure communication using the SSL protocol. To secure the communication link 610 in that manner would, however, require the remote console applet 606 and the remote console server 602 to have access to executable code containing the full suite of SSL functionality, which includes multiple versions of SSL executable code, digital certificate management, key exchange capability and dozens of encryption algorithms. Most of that functionality is not required to secure the communication link 610.

The remote console server 602 has limited memory resources because it is deployed as part of remote server management controller 200. Minimizing the size of executable code that must be stored in the memory of the remote server management controller 200 is a desirable goal for purposes of making the remote server management controller 200 as self-contained as possible. Transfer time of the code across slow data links is also shortened by making the code that must be transferred as small as possible. To help facilitate the goal of conserving memory space, the executable code implemented in the exemplary remote console server 602 comprises an encryption algorithm and not the entire suite of executable code needed for full SSL compatibility. In the exemplary embodiment, the executable code available to the remote console server 602 may be as little as a single encryption algorithm. That encryption may be the RC4 algorithm, but any other encryption algorithm may be used. The exact encryption algorithm used is not a crucial aspect of the invention.

The approach of transferring as little as a single encryption algorithm from the remote console server 602 eliminates the need to rely on the native capabilities of JAVA functionality in many browser applications. JAVA, as implemented in many web browsers, supports web page browsing but not full duplex data exchange.

In the exemplary embodiment shown in FIG. 3, the executable code available to the remote console server 602 does not necessarily include functionality that supports secure key exchange. If key exchange functionality is not available to the remote console server 602, some other mechanism for secure key exchange must be employed in order to secure the communication link 610 between the remote console applet 606 and the remote console server 602.

Figure 4:
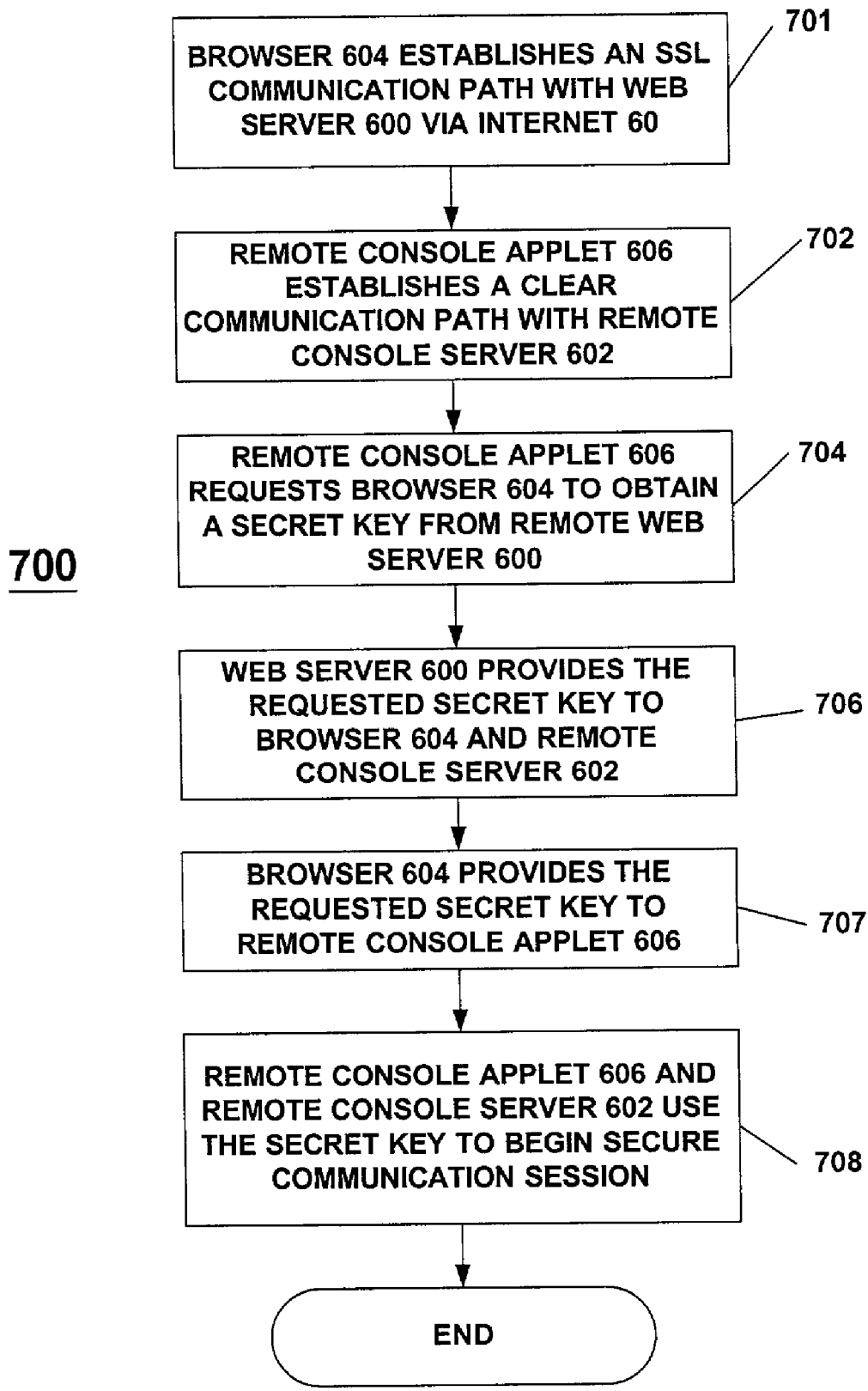
FIG. 4 is a process flow diagram showing an exemplary process for the establishment of a secure connection with a managed server across a publicly accessible data path such as the Internet.

An exemplary process for securing the communication link 610 is shown in FIG. 4. The process illustrated in FIG. 4 (generally referred to by reference numeral 700) allows secure key exchange between the remote console applet 606 and the remote console server 602 even if neither has access to software that provides secure key exchange functionality.

A user, who desires to establish a management communication session with the remote server management controller 200 (FIG. 3), launches the browser 604 from client computer 72 (FIG. 3). The user points the browser 604 at the URL of the remote management server controller 200. As shown at 701, the browser 604 establishes an SSL communication path 608 with the web server 600 via the Internet 60. The establishment of the communication path 608 may be done as described above with reference to FIG. 3.

At 702, the user engages the remote console applet 606, which establishes a clear (not encrypted) communication path 610 with the remote console server 602. As shown at 704, the remote console applet 606 communicates with the browser 604 over the communication link 605 and requests the browser 604 to obtain a secret key from the web server 600.

While the remote console applet 606 requests a secret key in the exemplary embodiment shown in FIG. 3 and FIG. 4, the request to the web server 600 could alternatively be for a secret (such as a random number) that would allow generation of a secret key as opposed to the secret key itself. In a further alternative, the request for a secret or secret key could be made by the remote console server 602 instead of the browser.

The web server 600 responds (at shown at 706) by providing the requested secret key to the browser 604 via encrypted communication link 608. The secret key is also passed from the web server 600 to the remote console server 602 via the communication link 601 (706).

As shown at 707, the browser 604 passes the secret key on to the remote console applet 606 via communication link 605. At 708, the remote console applet 606 and the remote console server 602 use the shared secret key that both have obtained from the web server 600 to begin encrypted communication across the communication link 610. Thus, communication link 610 is upgraded from "in the clear" to secure. The user may proceed to obtain sensitive management data and transmit control information to the remote server management controller 200.

Those of ordinary skill in the art will observe that the secret key requested by the remote console applet 606 from the browser 600 is transmitted only over communication paths that are either encrypted (for example, communication path 608) or internal to a single computer (for example, the communication paths 601 and 605). In this manner, hackers are effectively denied the opportunity to obtain the secret key and use it to decrypt sensitive data transferred between the remote console applet and the remote console server 602 during a management communication session.

To further thwart the effort of hackers to decrypt the information transmitted between the remote console applet 606 and the remote console server 602, the shared secret key requested by the remote console applet may be given a relatively short effective period (for example, a few minutes). The useful life of the secret key may be limited through a variety of methods such as through the use of timestamps. If additional time is needed for the management communication session, a new secret key could be requested prior to the expiration of the previous secret key. In this manner, the management communication session could continue uninterrupted.

As an alternative to requesting a new secret key prior to expiration of the old one, the remote console server 602 and the remote console applet 606 could either generate a plurality of secret keys upon receipt of the original secret key (or secret). The remote console server 602 and the remote console applet 606 could begin using the additional keys at agreed-upon times.

As an additional alternative, the remote console server 602 and the remote console applet 606 could incorporate functionality that would allow them to periodically update the secret key using an agreed-upon one-way mathematical transform (a hash). Examples of one-way transforms that could be used are the MD-5 algorithm or the SHA-1 algorithm. This key generation approach exploits the fact that the original exchange of a pre-master-secret ("PMS") (the originally requested key or secret) is transferred over a link that is encrypted between the browser 604 and the web server 600, so it is never in the clear. After receipt of the PMS, the applet creates a key by hashing the PMS with a known key value such as all zeroes. That key is used for a period of time that may be previously agreed upon. When it is time to generate a new key, the same computation is performed again: the then-existing key is hashed with the PMS and the result is the new key. This process may be expressed as follows:

KEY☐PMS☐KEY

In the above expression, the ☐symbol represents the one-way hash function. Because it is impossible to recover the input to the one-way-hash function from its output, it is very difficult or impossible to recover the pre-master-secret.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A remote server management controller, comprising:
   a web server adapted to engage in encrypted communication over a first communication link, the web server being further adapted to receive and respond to a request for encryption data by providing a public key in the form of a digital certificate over the first communication link, the encryption data being adapted to encrypt a second secure communication link; and
   a remote console server adapted for operable communication with the web server, the remote console server being further adapted to engage in communication with the client computer over the second communication link, wherein the remote console server receives the digital certificate from the web server and uses the public key contained therein to encrypt communications sent over the second communication link.

2. The remote server management controller of claim 1 wherein the remote console server is adapted to use the public key to decrypt communications received over the second communication link.

3. The remote server management controller of claim 1 wherein the request for the secret data is initiated by a remote console applet executing on the client computer, the remote console applet being adapted for operable communication with a browser application executing on the client computer, the remote console applet transmitting the request for encryption data to the browser application, the browser application transmitting the request for encryption data to the web server via the first communication link.

4. The remote server management controller of claim 1 wherein the first communication link is between the web server and a browser application executing on the client computer.

5. The remote server management controller of claim 1 wherein the second communication link is between the remote console server and a remote console applet executing on the client computer.

6. The remote server management controller of claim 1 wherein transmissions across the second communication link are encrypted using the RC4 transform.

7. A client computer, comprising:
   a browser application adapted to execute on the client computer, the browser application being adapted to transmit a request for encryption data to a remote server management controller and receive a public key in the form of a digital certificate across a first communication link; and
   a program adapted to execute on the client computer, the program being adapted to initiate the request for encryption and use the public key contained in the digital certificate to encrypt communication over a second communication link.

8. The client computer of claim 7 wherein the program is adapted to use the encryption data to decrypt information received via the second communication link.

9. The client computer of claim 7 wherein the encryption data is generated by a web server in the remote server management controller.

10. The client computer of claim 7 wherein the first communication link is between a web server in the remote server management controller and the browser application.

11. The client computer of claim 7 wherein the program is a remote console applet and the second communication link is between a remote console server in the remote server management controller and the remote console applet.

12. The client computer of claim 7 wherein transmissions across the second communication link are encrypted using the RC4 transform.

13. A method of employing a first communication link between a client computer and a managed server to upgrade a second communication link between the client computer and the managed server from clear to encrypted, wherein the first communication link is encrypted, the method comprising the acts of:
   receiving a request for encryption data from the client computer via the first communication link;
   transmitting encryption data by providing a public key in the form of a digital certificate to the client computer across the first communication link responsive to the request; and
   using the public key contained in the digital certificate to encrypt communications sent via the second communication link.

14. The method of claim 13 further comprising generating encryption data from the public key.

15. The method of claim 13, further comprising using the encryption data to decrypt data received via the second communication link.

16. The method of claim 13 wherein the recited acts are performed in the recited order.

* * * * *